United States Patent
Sokolov et al.

(10) Patent No.: US 10,764,060 B1
(45) Date of Patent: Sep. 1, 2020

(54) SYSTEMS AND METHODS FOR AUTHENTICATING A MULTIMEDIA STREAM

(71) Applicant: Symantec Corporation, Mountain View, CA (US)

(72) Inventors: Ilya Sokolov, Boston, MA (US); Keith Newstadt, Newton, MA (US)

(73) Assignee: NortonLifeLock Inc., Tempe, AZ (US)

( * ) Notice: Subject to any disclaimer, the term of this patent is extended or adjusted under 35 U.S.C. 154(b) by 218 days.

(21) Appl. No.: 15/946,749

(22) Filed: Apr. 6, 2018

(51) Int. Cl.
*H04L 9/32* (2006.01)
*H04L 29/06* (2006.01)

(52) U.S. Cl.
CPC ............ *H04L 9/3247* (2013.01); *H04L 9/321* (2013.01); *H04L 9/32* (2013.01); *H04L 63/08* (2013.01); *H04L 63/12* (2013.01)

(58) Field of Classification Search
CPC ....... H04L 9/32; H04L 9/3231; H04L 9/3247; H04L 63/04–0492; H04L 63/08; H04L 63/0861; H04L 29/06755–0685
See application file for complete search history.

(56) References Cited

U.S. PATENT DOCUMENTS

| | | | | |
|---|---|---|---|---|
| 8,095,796 B2* | 1/2012 | Conwell | ................ | G06F 16/68 713/176 |
| 9,020,964 B1* | 4/2015 | Kaminski, Jr. | ......... | G06F 16/43 707/758 |
| 9,923,921 B1* | 3/2018 | Grafi | ...................... | H04L 9/006 |
| 2013/0042262 A1* | 2/2013 | Riethmueller | .......... | G06F 16/74 725/14 |
| 2014/0156997 A1* | 6/2014 | Gopalakrishna Rao | ..................... | H04N 21/235 713/176 |
| 2016/0314120 A1* | 10/2016 | Dauderman | .......... | G06F 16/951 |
| 2016/0380770 A1* | 12/2016 | Whitmer | ............... | H04L 9/0643 713/181 |
| 2018/0108354 A1* | 4/2018 | Negi | ....................... | G10L 15/26 |
| 2019/0034428 A1* | 1/2019 | Pobloth | ................... | G06F 16/41 |

OTHER PUBLICATIONS

Vincent, James, "Lyrebird claims it can recreate any voice using just one minute of sample audio", URL: https://www.theverge.com/2017/4/24/15406882/ai-voice-synthesis-copy-human-speech-lyrebird, Apr. 24, 2017, 4 pages.

(Continued)

*Primary Examiner* — Kristine L Kincaid
*Assistant Examiner* — Shaqueal D Wade
(74) *Attorney, Agent, or Firm* — FisherBroyles, LLP

(57) ABSTRACT

The disclosed computer-implemented method for authenticating a multimedia stream may include generating a metadata transcript based on at least a portion of a multimedia stream and digitally signing the metadata transcript. The method may also include transmitting both the digitally signed metadata transcript and the multimedia stream to a recipient device to enable the recipient device to authenticate the multimedia stream. The recipient device may authenticate the multimedia stream based on a comparison of the digitally signed metadata transcript with an observed metadata transcript. The observed metadata transcript may be locally generated by the recipient device based on the multimedia stream. Various other methods, systems, and computer-readable media are also disclosed.

20 Claims, 7 Drawing Sheets

(56) References Cited

OTHER PUBLICATIONS

Suwajanakorn et al., "Synthesizing Obama: Learning Lip Sync from Audio", ACM Transactions on Graphics, vol. 36, No. 4, Article 95, URL: http://grail.cs.washington.edu/projects/AudioToObama/siggraph17_obama.pdf, Jul. 2017, 13 pages.

Face2Face: Real-time Face Capture and Reenactment of RGB Videos (CVPR 2016 Oral), URL: https://www.youtube.com/watch?v=ohmajJTcpNk, 2016, 3 pages.

Matsuda et al., Fuzzy Signatures: Relaxing Requirements and a New Construction, Proceedings of the 14th International Conference on Applied Cryptography and Network Security (ACNS 2016), LNCS 9696, 2016, pp. 97-116.

\* cited by examiner

SYSTEMS AND METHODS FOR AUTHENTICATING A MULTIMEDIA STREAM

BACKGROUND

Many people increasingly rely on the internet for finding and viewing media. News organizations and other media companies release media content on traditional media channels, such as television, as well as on the internet. Traditional media channels have conventionally been exclusive to large media companies due to the high barrier to entry for broadcasting. Thus, people may confer a sense of authenticity to media broadcast through traditional media channels. Internet media channels have a low barrier to entry for broadcasting, allowing smaller companies and individuals to highly accessible media content. People may confer a similar sense of authenticity to such media content, particularly if the media content is associated with well-known figures.

However, advances in video editing, artificial intelligence, and natural language processing have given rise to technology that can significantly alter media content. Voice synthesizing technology allows the creation of voice clips of someone's speech, essentially creating spoken words of a person who has not actually spoken those words. Video editing with artificial intelligence allows replacing a one person's face for another in a video. It is now possible to create videos of persons doing and/or saying things without having the person actually do or say the things. Thus, it is possible to forge various media streams, such as video or audio, of persons doing or saying things the person has never done or said.

The instant disclosure, therefore, identifies and addresses a need for systems and methods for authenticating a multimedia stream.

SUMMARY

As will be described in greater detail below, the instant disclosure describes various systems and methods for authenticating a multimedia stream.

In one example, a method for authenticating a multimedia stream may include (1) generating a metadata transcript based on at least a portion of a multimedia stream, (2) digitally signing the metadata transcript, and (3) transmitting both the digitally signed metadata transcript and the multimedia stream to a recipient device to enable the recipient device to authenticate the multimedia stream based on a comparison of the digitally signed metadata transcript with an observed metadata transcript, wherein the observed metadata transcript is locally generated by the recipient device based on the multimedia stream.

In some examples, the comparison of the digitally signed metadata transcript with the observed metadata transcript may include a direct comparison, and the multimedia stream may be authenticated based on the digitally signed metadata transcript matching the observed metadata transcript.

In some examples, the comparison of the digitally signed metadata transcript with the observed metadata transcript may include (4) generating an original sense graph from the digitally signed metadata transcript, based on natural language processing, (5) generating an observed sense graph from the observed metadata transcript, based on natural language processing, (6) comparing the original sense graph with the observed sense graph to determine whether the observed sense graph represents the original sense graph, and (7) authenticating the multimedia stream when the observed sense graph represents the original sense graph.

In some examples, the method may further include embedding the digitally signed metadata transcript into the multimedia stream. In some examples, the method may further include storing the digitally signed metadata transcript on a cloud server accessible to the recipient device.

In some examples, the metadata transcript may include a textual transcript of dialogue in the multimedia stream. In some examples, the metadata transcript may include identifications of persons in the multimedia stream. In some examples, the metadata transcript may include descriptions of at least one of microexpressions, vocal expressions, tone of voice, body language, and hand gestures of persons in the multimedia stream.

In one embodiment, a method for authenticating a multimedia stream may include (1) receiving, from a signing device, both a multimedia stream and a digitally signed metadata transcript corresponding to the multimedia stream, (2) authenticating the digitally signed metadata transcript, (3) generating an observed metadata transcript based on the received portion of the multimedia stream, (4) comparing the authenticated metadata transcript to the observed metadata transcript, and (5) authenticating, based on the comparison, the received portion of the multimedia stream.

In some examples, the comparison of the authenticated metadata transcript with the observed metadata transcript may include a direct comparison, and the multimedia stream may be authenticated based on the authenticated metadata transcript matching the observed metadata transcript.

In some examples, the comparison of the authenticated metadata transcript with the observed metadata transcript may include (6) generating an original sense graph from the authenticated metadata transcript, based on natural language processing, (7) generating an observed sense graph from the observed metadata transcript, based on natural language processing, (8) comparing the original sense graph with the observed sense graph to determine whether the observed sense graph represents the original sense graph, and (9) authenticating the multimedia stream when the observed sense graph represents the original sense graph.

In some examples, the method may further comprise extracting the digitally signed metadata transcript from the multimedia stream. In some examples, the method may further comprise retrieving the digitally signed metadata transcript from a cloud server accessible to the recipient device.

In some examples, the metadata transcript may include one or more of: a textual transcript of dialogue in the multimedia stream; identifications of persons in the multimedia stream; and descriptions of at least one of microexpressions, vocal expressions, tone of voice, body language, and hand gestures of persons in the multimedia stream.

In some examples, a system for authenticating a multimedia stream may include a signing device and a recipient device. The signing device may comprise at least one physical processor and at least one module configured to: generate a metadata transcript based on at least a portion of a multimedia stream; digitally sign the metadata transcript; transmit both the digitally signed metadata transcript and the multimedia stream. The recipient device may comprise at least one physical processor and at least one module configured to: receive both the digitally signed metadata transcript and the multimedia stream from the signing device; authenticate the digitally signed metadata transcript; generate an observed metadata transcript based on the multimedia stream; compare the authenticated metadata transcript to the observed metadata transcript; and authenticate, based on the comparison, the multimedia stream.

In some examples, the comparison of the authenticated metadata transcript with the observed metadata transcript may include a direct comparison, and the multimedia stream is authenticated may be based on the authenticated metadata transcript matching the observed metadata transcript.

In some examples, the comparison of the authenticated metadata transcript with the observed metadata transcript may include: generating an original sense graph from the authenticated metadata transcript, based on natural language processing; generating an observed sense graph from the observed metadata transcript, based on natural language processing; comparing the original sense graph with the observed sense graph to determine whether the observed sense graph represents the original sense graph; and authenticating the multimedia stream when the observed sense graph represents the original sense graph.

In some examples, transmitting both the digitally signed metadata transcript and the multimedia stream may include embedding the digitally signed metadata transcript into the multimedia stream. In some examples, transmitting both the digitally signed metadata transcript and the multimedia stream may include storing the digitally signed metadata transcript on a cloud server accessible to the recipient device.

In some examples, the metadata transcript may include one or more of: a textual transcript of dialogue in the multimedia stream; identifications of persons in the multimedia stream; and descriptions of at least one of microexpressions, vocal expressions, tone of voice, body language, and hand gestures of persons in the multimedia stream.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
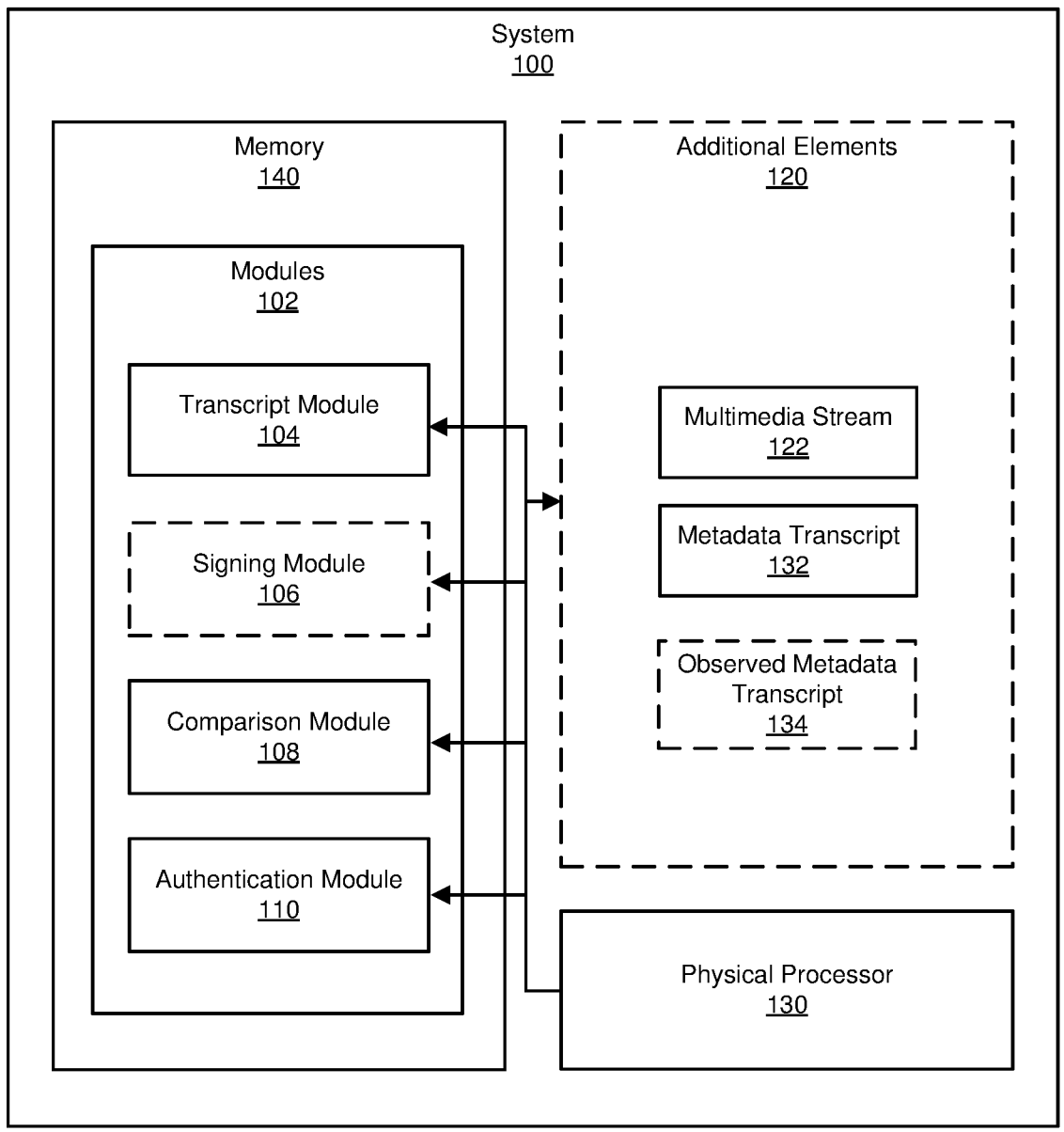
FIG. 1 is a block diagram of an example system for authenticating a multimedia stream.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for authenticating a multimedia stream. Users often consume media from internet sources. Advances in technology may enable increasingly complicated media content editing and altering. However, users may be fooled by media content that has been altered to look genuine, but may convey different meaning than that of the original media source. For example, a person's face or words may be altered, yet look real. Traditional file authentication methods may not provide a viable solution, as video edits which do not affect the meaning, such as improving video and/or sound quality, may fail such authentication methods. In other words, users may be more interested in preserving the information conveyed by the media content, rather than digital file accuracy.

As will be explained in greater detail below, by generating a metadata transcript of an original multimedia stream, and by generating an observed multimedia transcript of a received multimedia stream, the systems and methods described herein may be able to authenticate the received multimedia stream for informational integrity. By comparing metadata transcripts rather than binary files, the systems and methods described herein may authenticate the information conveyed by multimedia streams.

In addition, the systems and methods described herein may improve the functioning of a computing device by reducing processing and more efficiently providing multimedia stream authentication, for example as compared to separately digitally signing every edited multimedia stream. These systems and methods may also improve the field of authentication and verification, particularly for multimedia streams, by providing a flexible authentication scheme.

Figure 2:
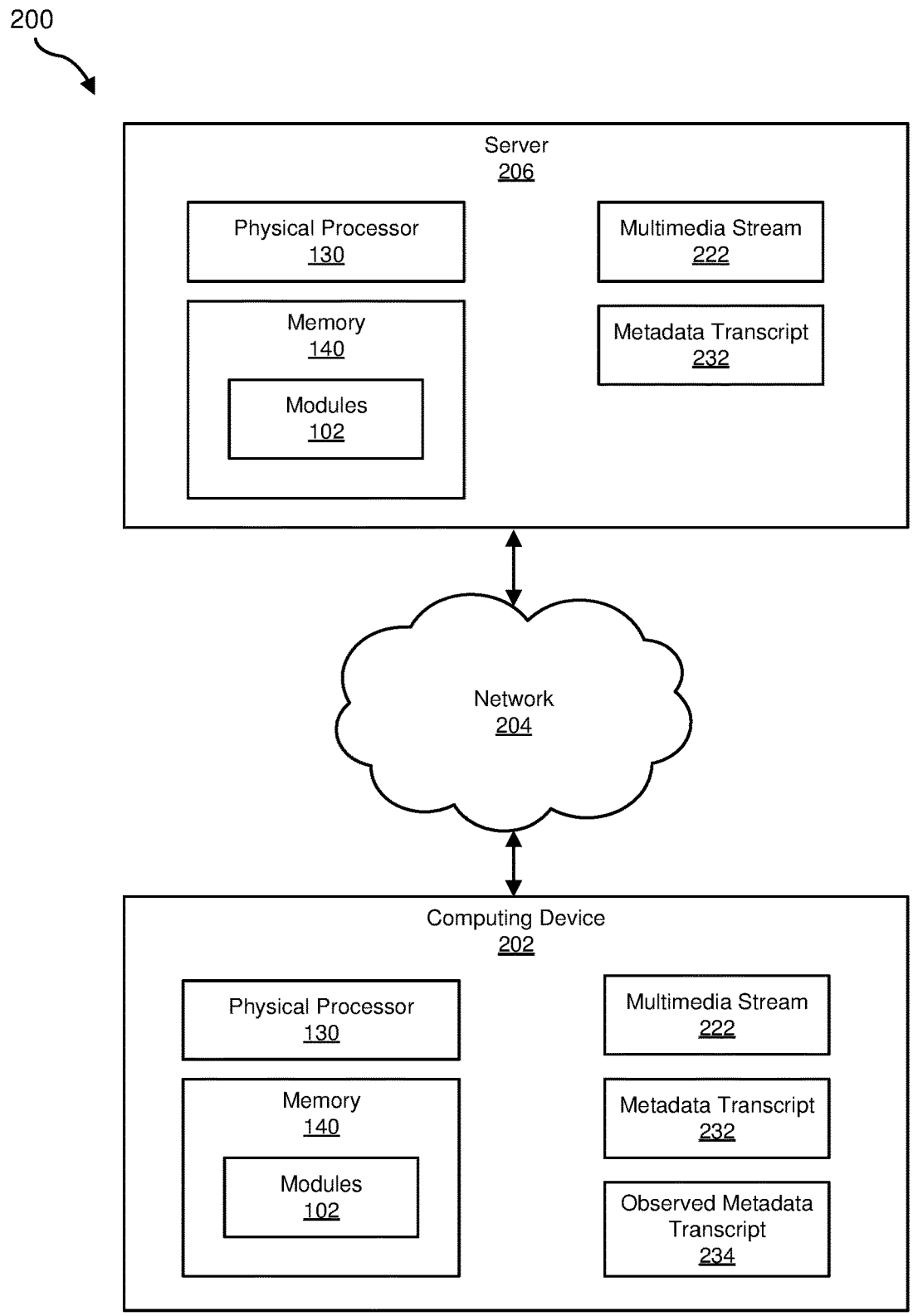
FIG. 2 is a block diagram of an additional example system for authenticating a multimedia stream.

The following will provide, with reference to FIGS. 1-2, detailed descriptions of example systems for authenticating a multimedia stream. Detailed descriptions of corresponding computer-implemented methods will also be provided in connection with FIG. 3 and FIG. 4. Detailed descriptions of metadata transcript comparison will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for authenticating a multimedia stream. As illustrated in this figure, example system 100 may include one or more modules 102 for performing one or more tasks. As will be explained in greater detail below, modules 102 may include a transcript module 104, a signing module 106, a comparison module 108, and an authentication module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks.

For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks. One or more modules, such as signing module 106, may be present in some implementations of system 100 (e.g., some implementations of server 206), and may not be present in other implementations (e.g., some implementations of computing device 202) or may be remotely accessed.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate authenticating a multimedia stream. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as a multimedia stream 122, a metadata transcript 132, and an observed metadata transcript 134. One or more additional elements 120, such as observed metadata transcript 134 may be present on some implementations of system 100 (e.g., some implementations of computing device 202) or may not be present on some implementations of system 100 (e.g., some implementations of server 206), or may be remotely accessed.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to authenticate multimedia streams. For example, and as will be described in greater detail below, one or more of modules 102 may cause computing device 202 and/or server 206 to recite steps of method claim using FIG. 2.

Computing device 202 generally represents any type or form of computing device capable of reading computer-executable instructions. For instance, computing device 202 may be a client device such as a smartphone. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of performing one or more steps to authenticate multimedia streams. Server 206 may be, for example, a media server hosting multimedia streams. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Multimedia stream 222 generally represents any type or form of multimedia streams, such as videos and audio files, which may be subject to editing, altering, and other changes. Metadata transcript 232 generally represents any type or form of metadata transcript which describes multimedia stream 222, as will be described further below. Observed metadata transcript 234 generally represents any type or form of metadata transcript based on a received multimedia stream such as multimedia stream 222, as will be described further below.

Figure 3:
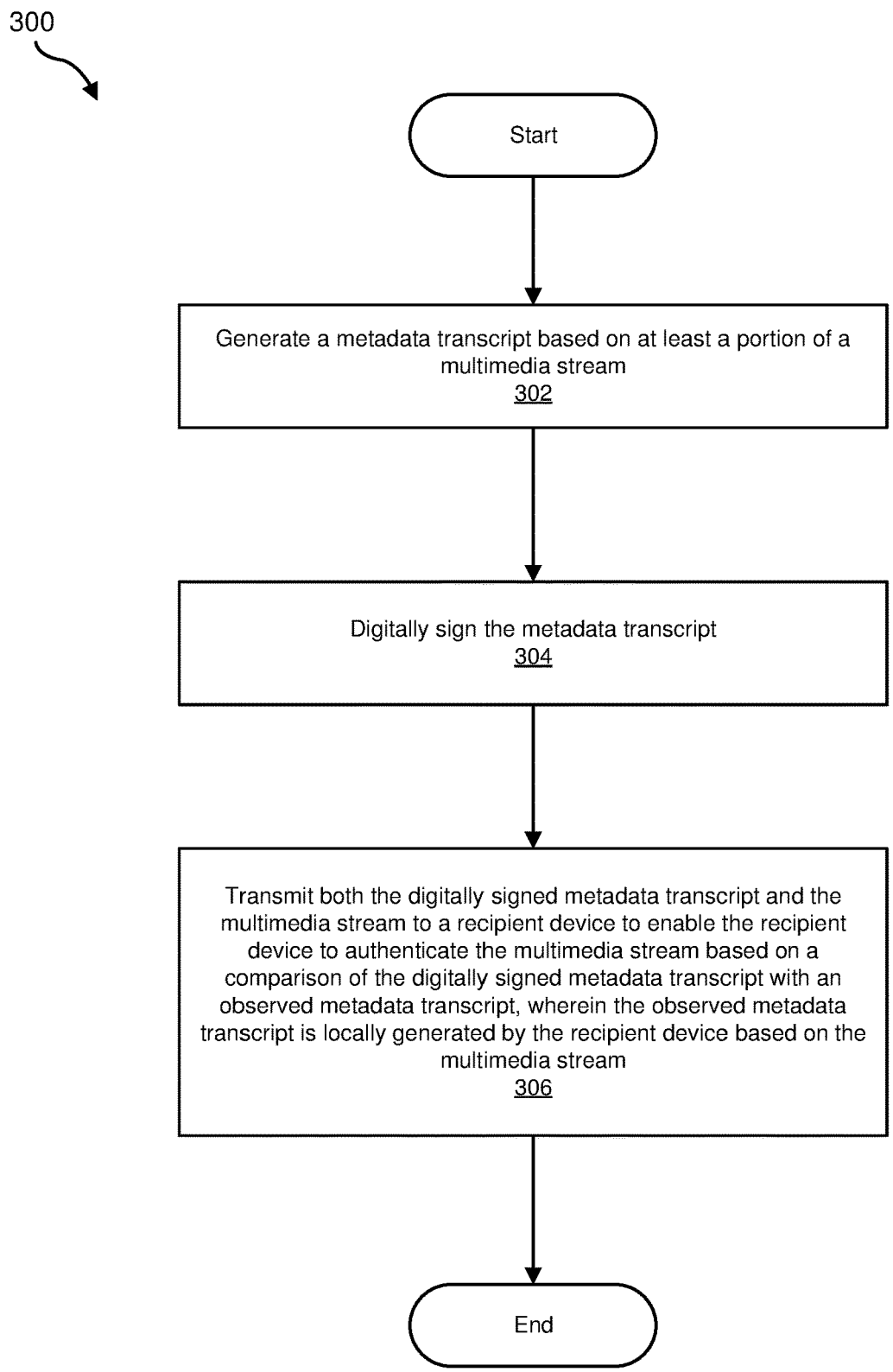
FIG. 3 is a flow diagram of an example method for authenticating a multimedia stream.

FIG. 3 is a flow diagram of an example computer-implemented method 300 for authenticating a multimedia stream. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may generate a metadata transcript based on at least a portion of a multimedia stream. For example, transcript module 104 may, as part of server 206 in FIG. 2, generate metadata transcript 232 based on multimedia stream 222.

The term "metadata transcript," as used herein, generally refers to a description of a content of a corresponding multimedia stream, for example describing words spoken, actions of persons, descriptions of events, locations, objects, and other metadata, which may serve as a fingerprint of the multimedia stream.

The term "multimedia stream," as used herein, generally refers to a multimedia file, which may include video and/or audio, and may be a discrete piece of media content, or a stream of video and/or audio.

The systems described herein may perform step 302 in a variety of ways. In one example, server 206 may directly analyze a file of multimedia stream 222, or may play back multimedia stream 222 and use other sensors of server 206, such as a microphone, camera, direct stream access, etc., to generate metadata transcript 232. The metadata transcript may be generated based on converting spoken dialogue to text such that the metadata transcript includes a textual transcript of dialogue in the multimedia stream. Server 206 may use speech conversion applications to convert spoken dialogue.

The metadata transcript may include identifications of persons in the multimedia stream, which may be identified, for example, through tagging and/or facial recognition.

The metadata transcript may include additional metadata of the multimedia stream, for example descriptions of at least one of microexpressions, vocal expressions (e.g., weak or loud voices), tone of voice, body language, and hand gestures of persons in the multimedia stream. Machine learning classifiers may be used to recognize the metadata.

The term "microexpression," as used herein, generally refers to facial expressions shown on human faces according to emotions experienced, and may be involuntary and brief. Examples of microexpressions include, without limitation, signs of disgust, anger, fear, sadness, happiness, contempt, surprise, contentment, pleasure, and shame. Machine learning classifiers may identify microexpressions.

The metadata transcript generation may be repeatable such that for a given multimedia stream, the same or similar metadata transcript may always be produced.

As illustrated in FIG. 3, at step 304 one or more of the systems described herein may digitally sign the metadata transcript. For example, signing module 104 may, as part of server 206 in FIG. 2, digitally sign metadata transcript 232.

The term "digitally sign," as used herein, generally refers to procedures for the secure transfer of files such that a recipient can verify that the file is received unaltered from the sender. One non-limiting example includes public key infrastructure (PKI), in which a public key may be used to encrypt data, that can only be decrypted by a recipient having an associated private key.

The systems described herein may perform step 304 in a variety of ways. In one example, server 206 may digitally sign metadata transcript 232 using PKI or another appropriate procedure.

As illustrated in FIG. 3, at step 306 one or more of the systems described herein may transmit both the digitally signed metadata transcript and the multimedia stream to a recipient device to enable the recipient device to authenticate the multimedia stream based on a comparison of the digitally signed metadata transcript with an observed metadata transcript, wherein the observed metadata transcript is locally generated by the recipient device based on the multimedia stream. For example, server 206 in FIG. 2, may transmit multimedia stream 222 and metadata transcript 232 to computing device 202. As will be described further below, computing device 202 may locally generate observed metadata transcript 234 for comparison with metadata transcript 232 to authenticate multimedia stream 222.

The systems described herein may perform step 306 in a variety of ways. In one example, server 206 may embed digitally signed metadata transcript 232 into multimedia stream 222. Metadata transcript 232 may then be transferred with multimedia stream 222.

In another example, server 206 may store digitally signed metadata transcript 232 on a cloud server accessible to computing device 202. Multimedia stream 222 may include a link or other pointer to metadata transcript 232 for computing device 202 to retrieve.

Figure 4:
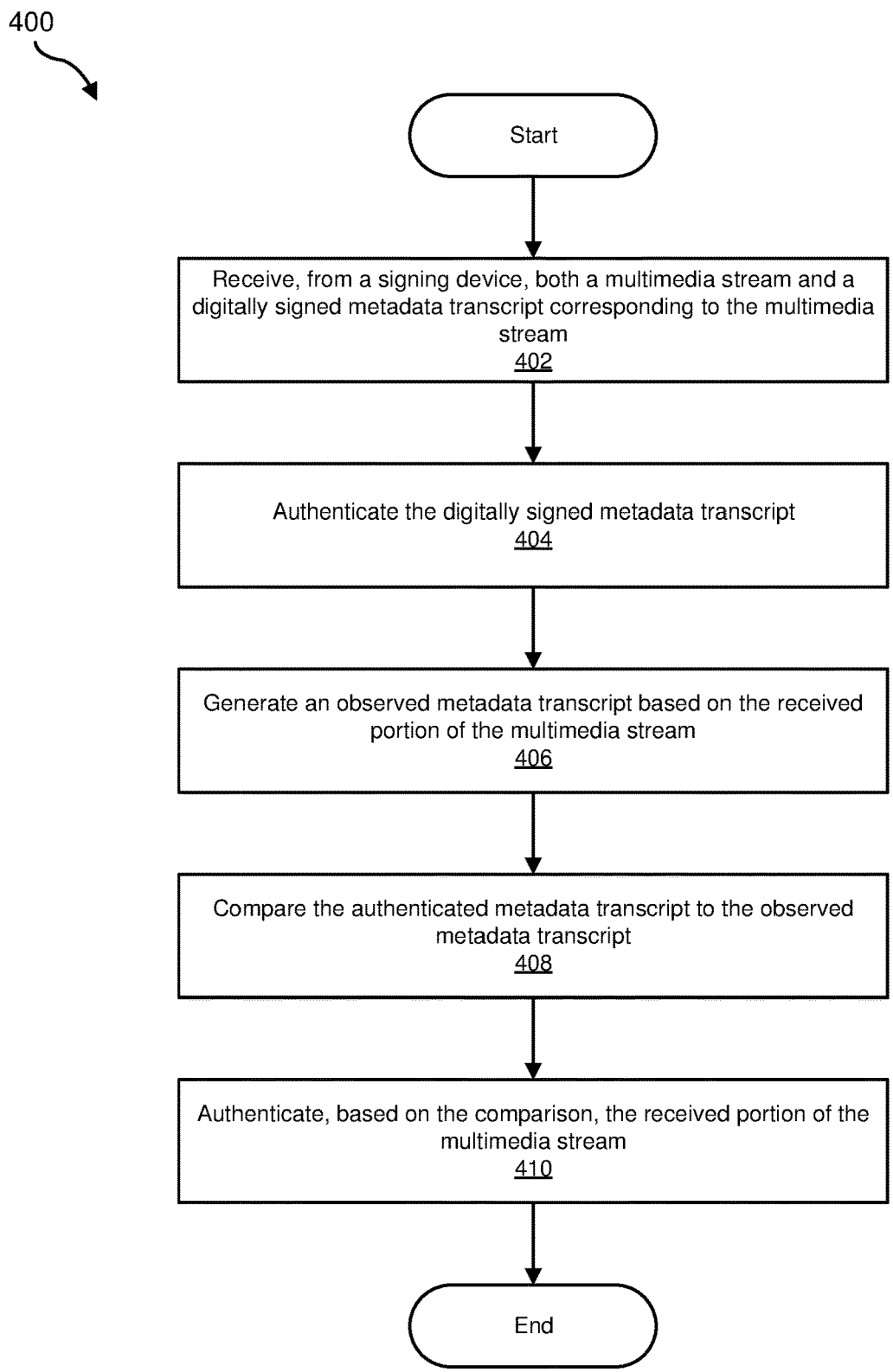
FIG. 4 is a flow diagram of another example method for authenticating a multimedia stream.

FIG. 4 is a flow diagram of an example computer-implemented method 400 for authenticating a multimedia stream. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may receive, from a signing device, both a multimedia stream and a digitally signed metadata transcript corresponding to the multimedia stream. For example, computing device 202 in FIG. 2, may receive from server 206 multimedia stream 222 and metadata transcript 232.

The systems described herein may perform step 402 in a variety of ways. In one example, computing device 202 may extract digitally signed metadata transcript 232 from multimedia stream 222.

In another example, computing device 202 may retrieve digitally signed metadata transcript 232 from a cloud server accessible to computing device 202.

As illustrated in FIG. 4, at step 404 one or more of the systems described herein may authenticate the digitally signed metadata transcript. For example, signing module 106 may, as part of computing device 202 in FIG. 2, authenticate metadata transcript 232.

The systems described herein may perform step 404 in a variety of ways. In one example, computing device 202 may decrypt, using a private key, metadata transcript 232. If successful, metadata transcript 232 may be authenticated. In other examples, other procedures for authenticating digitally signed files may be used.

As illustrated in FIG. 4, at step 406 one or more of the systems described herein may generate an observed metadata transcript based on the received portion of the multimedia stream. For example, transcript module 104 may, as part of computing device 202 in FIG. 2, generate observed metadata transcript 234 based on multimedia stream 222.

The systems described herein may perform step 406 in a variety of ways. In one example, computing device 202 may directly analyze a file of multimedia stream 222, or may play back multimedia stream 222 and user other sensors of computing device 202, such as a microphone, camera, direct stream access, etc., to generate observed metadata transcript 234. The observed metadata transcript may be generated based on converting spoken dialogue to text such that the observed metadata transcript includes a textual transcript of dialogue in the multimedia stream. Computing device 202 may use speech conversion applications to convert spoken dialogue.

The observed metadata transcript may include identifications of persons in the multimedia stream, which may be identified, for example through, tagging and/or facial recognition.

The metadata transcript may include additional metadata of the multimedia stream, for example descriptions of one or more of microexpressions, vocal expressions, tone of voice, body language, and hand gestures of persons in the multimedia stream. Machine learning classifiers may be used to recognize the metadata.

The procedure for generating the observed metadata transcript by the recipient device may mirror the procedure for generating the observed metadata transcript by the signing device. In some examples, the metadata transcript generation procedure performed by the recipient device may be the same as the metadata transcript generation procedure performed by the signing device.

In other examples, the metadata transcript generation procedure performed by the recipient device may approximate the metadata transcript generation procedure performed by the signing device. For instance, computing device 202 may not have the same processing power and/or access to resources, such as machine learning classifiers, as server 206 such that computing device 202 may not feasibly be able to perform the same metadata transcript generation procedure as server 206. However, the metadata transcript generation procedure performed by computing device 202 may approximate the metadata transcript generation procedure performed by computing device 202 such that for an unaltered multimedia stream, the two procedures may produce matching metadata transcripts when compared to each other.

As illustrated in FIG. 4, at step 408 one or more of the systems described herein may compare the authenticated metadata transcript to the observed metadata transcript. For example, comparison module 108 may, as part of computing device 202 in FIG. 2, compare metadata transcript 232 to observed metadata transcript 234.

The systems described herein may perform step 408 in a variety of ways. In one example, the comparison of the authenticated metadata transcript with the observed metadata transcript includes a direct comparison, and the multimedia stream is authenticated based on the authenticated metadata transcript matching the observed metadata transcript. For example, metadata transcript 232 may be directly compared to observed metadata transcript 234. A textual transcript of metadata transcript 232 may be directly compared to a textual transcript of observed metadata transcript 234, such as a word for word comparison. In certain examples, the metadata transcripts may match if the number of words satisfies a word matching threshold ratio, such as 95% or 100%.

Direct comparison may be favorable in certain implementations, for instance for faster processing and simpler implementation or situations in which video is not commonly cut. For example, direct comparison may be able to determine significant differences such as missing words which may significantly change meaning of a sentence, such as negations (e.g., "He will arrive today," versus "He will not arrive today"), or replaced words, such as geographical references (e.g., "He will arrive in Los Angeles," versus "He will arrive in San Francisco").

In other implementations, direct comparison may be too simplistic. For example, due to the probabilistic nature of voice recognition methods, noise such as incorrect word recognition, inability to recognize irony in a voice, etc., may be introduced into the textual transcript. In addition, if the original multimedia stream is cut into a shorter clip, the shorter clip may be a valid clip of the original multimedia stream, but may fail the direct comparison.

In another example, the metadata transcripts may be generated to develop and compare general senses or contexts of multimedia streams. Syntactic or sense graphs may be generated and compared. The term "sense graph," as used herein, generally refers to pattern structures, such as graphs with weighted nodes, for representing an object, such as dialogue, with a set of symbolic features, which may be used for pattern recognition. Sense graphs may allow comparisons which consider more complex interrelationships between attributes than flat vectors may allow for. Natural language processing may use sense graphs to compare nuances in dialogue.

The comparison of the authenticated metadata transcript with the observed metadata transcript may include generating an original sense graph from the authenticated metadata transcript, based on natural language processing and generating an observed sense graph from the observed metadata transcript, based on natural language processing. The original sense graph may be compared with the observed sense graph to determine whether the observed sense graph represents the original sense graph.

The sense graph comparison may be based on, for example, natural language processing. A ratio of match between the sense graphs that is above a threshold ratio may indicate a low likelihood that the multimedia stream was tampered with. A ratio of match that is below the threshold ratio may indicate a high likelihood that the multimedia stream was tampered with. The multimedia stream may be authenticated when the observed sense graph represents the original sense graph, for example if the ratio of match is above the threshold ratio. Whether the observed sense graph represents the original sense graph may be determined with other methods, such as other natural language processing methods.

As illustrated in FIG. 4, at step 410 one or more of the systems described herein may authenticate, based on the comparison, the received portion of the multimedia stream. For example, authentication module 110 may, as part of computing device 202 in FIG. 2, authenticate multimedia stream 222 based on the comparison of metadata transcript 232 with observed metadata transcript 234.

Figure 5:
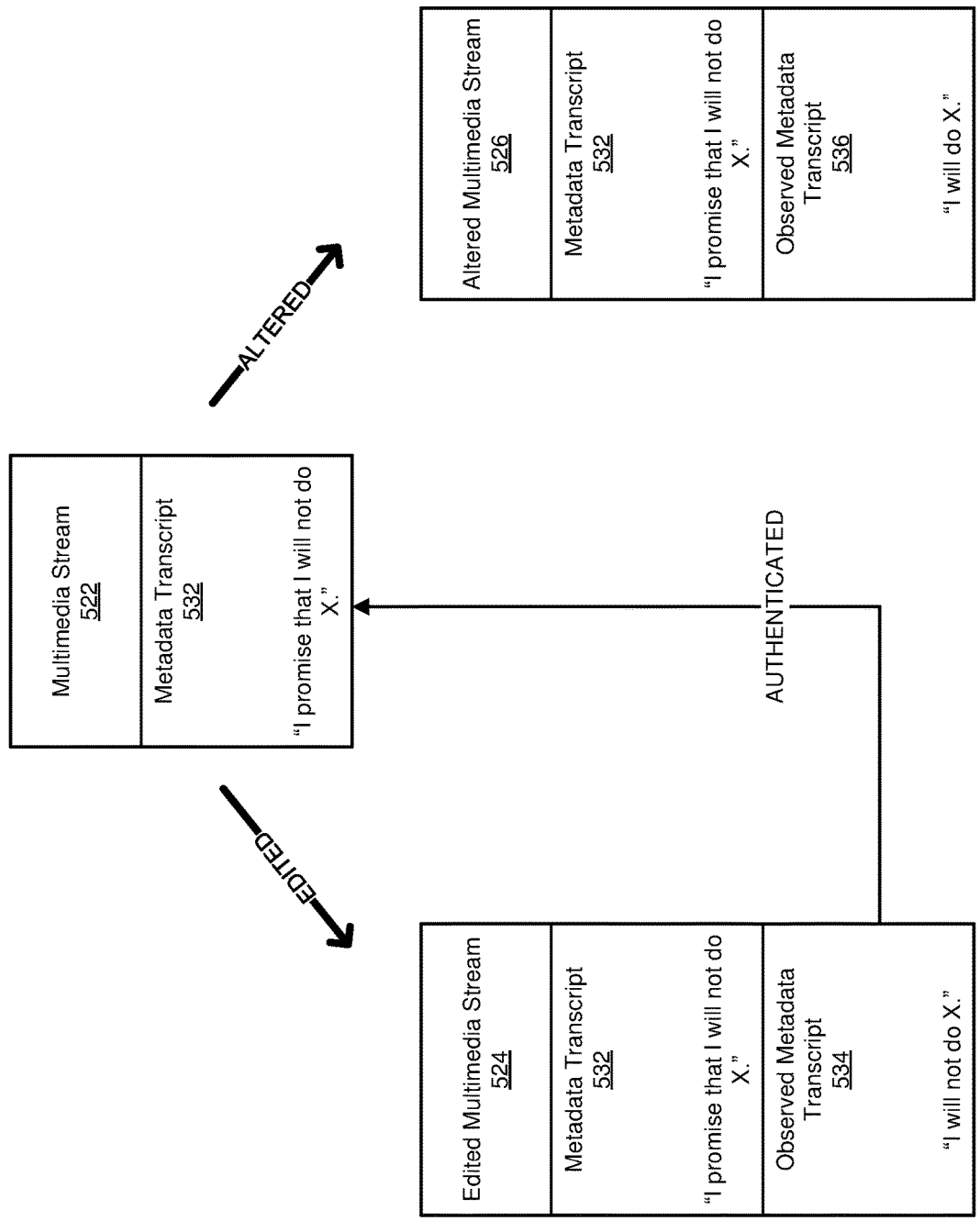
FIG. 5 is a diagram of metadata transcript comparison according to aspects of the present disclosure.

The systems described herein may perform step 410 in a variety of ways. FIG. 5 depicts a comparison process for authentication, similar to steps 408 and 410, which may be performed by a recipient device, such as computing device 202. FIG. 5, depicts a multimedia stream 522, which may correspond to multimedia stream 222, and a metadata transcript 532, which may correspond to metadata transcript 232. FIG. 5 also depicts an edited multimedia stream 524, a metadata transcript 532, an observed metadata transcript 534, an altered multimedia stream 526, a metadata transcript 532, and an observed metadata transcript 536.

Multimedia stream 522 may be edited to create edited multimedia stream 524. A recipient device, such as computing device 202 may receive edited multimedia stream 524 and metadata transcript 532. Metadata transcript 532 may not be edited or altered without failing the authentication provided by digital signing. In other words, the digital file for metadata transcript 532 may not be changed in any way without breaking the digital signing. Such strict adherence to the original file may not be desirable for multimedia streams. For example, a news organization may have a long video file, such as a speech, but may wish to edit the long video file. Edits may include cropping, sharpening, sound noise filtering, video compressing, etc., which may improve video quality. The news organization may also wish to cut out portions of the long video file, for example to highlight certain segments and remove dead time. Such edits may not change the original sense or information conveyed by the original long video file, but may result in an edited video file which would fail authentication by digital signing. However, a viewer may not care as much for digital file integrity as authenticity of the information conveyed.

Multimedia stream 522 may include video of a speech with speaker stating, "I promise that I will not do X," as indicated in metadata transcript 532. Edited multimedia stream 524 may be edited as a shortened clip of the speech, with the speaker saying, "I will not do X," as indicated in observed metadata transcript 534. In comparing observed metadata transcript 534 with metadata transcript 532, observed metadata transcript 534 may represent metadata transcript 532, as the sense or meaning or information conveyed has not changed (e.g., "I will not do X" may not have a different meaning as "I promise that I will not do X"). Thus, edited multimedia stream 524 may be authenticated.

Multimedia stream 522 may be altered to create altered multimedia stream 526. A recipient device, such as computing device 202 may receive altered multimedia stream 526 and metadata transcript 532. Multimedia stream 522 may have been tampered with or altered to create altered multimedia stream 526. Alterations which change sense or meaning or information conveyed may include removal of spoken words. More drastic alterations may include removal and/or replacement of persons and/or objects, changing of dialogue, etc. Altered multimedia stream 526 may be altered such that the speaker says, "I will do X," as indicated in observed metadata transcript 536. In comparing observed metadata transcript 536 with metadata transcript 532, observed metadata transcript 536 may not represent metadata transcript 532, as the sense or meaning or information conveyed has changed (e.g., "I will do X" may have a different meaning than "I promise that I will not do X"). Thus, altered multimedia stream 526 may not be authenticated.

As explained above, multimedia streams, and portions thereof, may be authenticated. A content producer may produce a multimedia stream and generate a metadata transcript based on the multimedia stream. The content producer may digitally sign the metadata transcript and sends the multimedia stream with the digitally signed metadata transcript. A user on a user device may receive the multimedia stream with the digitally signed metadata transcript. The user device may authenticate the metadata transcript based on the digital signing. The user device may also generate a local metadata transcript based on the received multimedia stream. The user device may authenticate the received multimedia stream if the local metadata transcript reflects the authenticated metadata transcript. By generating and comparing metadata transcripts, the multimedia stream may advantageously be authenticated even if the user device receives an edited version of the multimedia stream. Edits may include cropping, cutting, adding filters, etc. Such edits may not change a sense of the metadata transcript such that the multimedia stream may be authenticated. Edits such as changing faces, adding or removing spoken words, may change the sense of the metadata transcript such that the edited multimedia stream may not be authenticated. Thus, authenticating a multimedia stream may indicate that the information conveyed has not been changed, even if the multimedia stream is edited from the original multimedia stream. The user may know that the authenticated multimedia stream is a trustworthy representation of the original multimedia stream.

Figure 6:
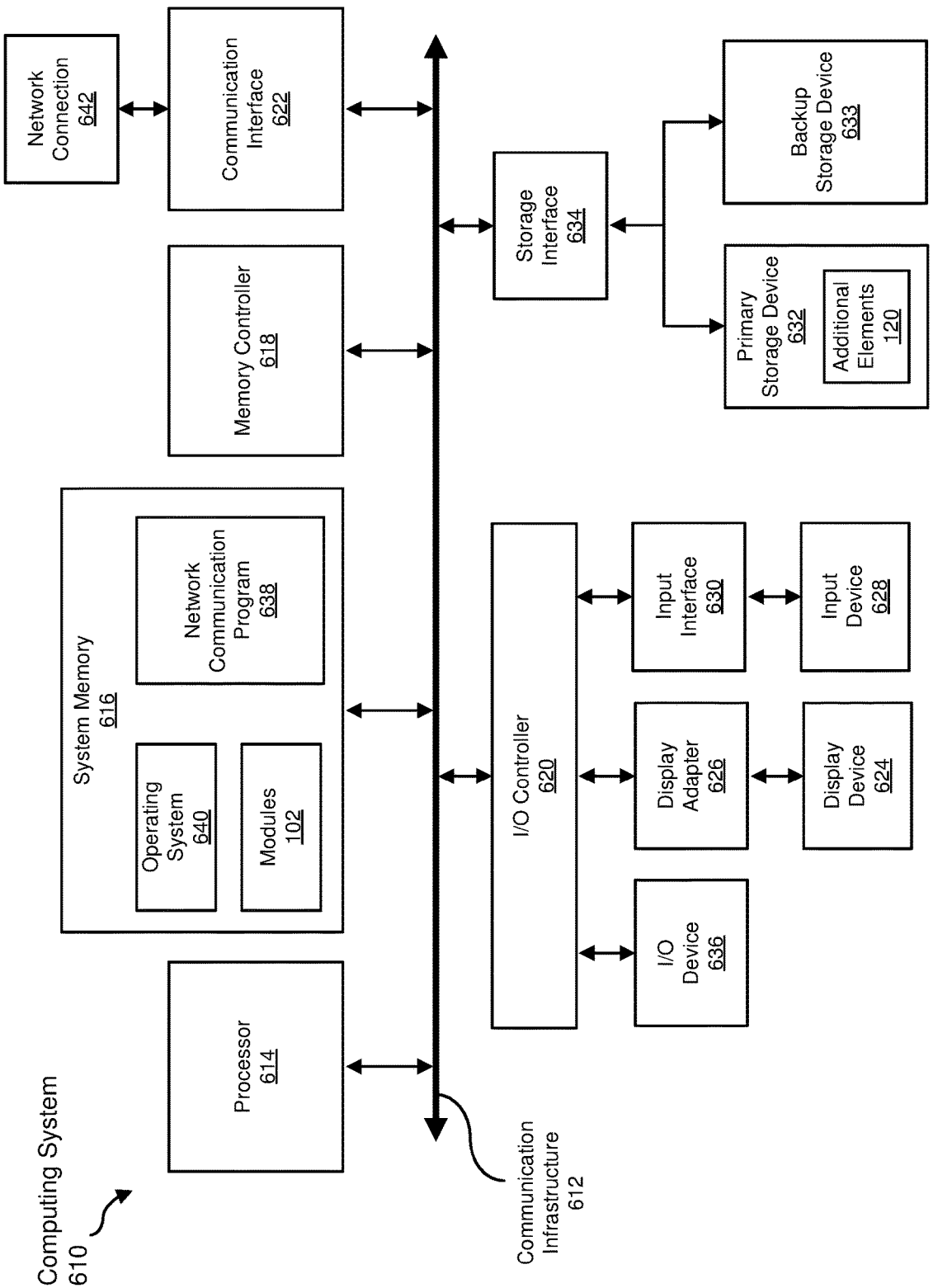
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
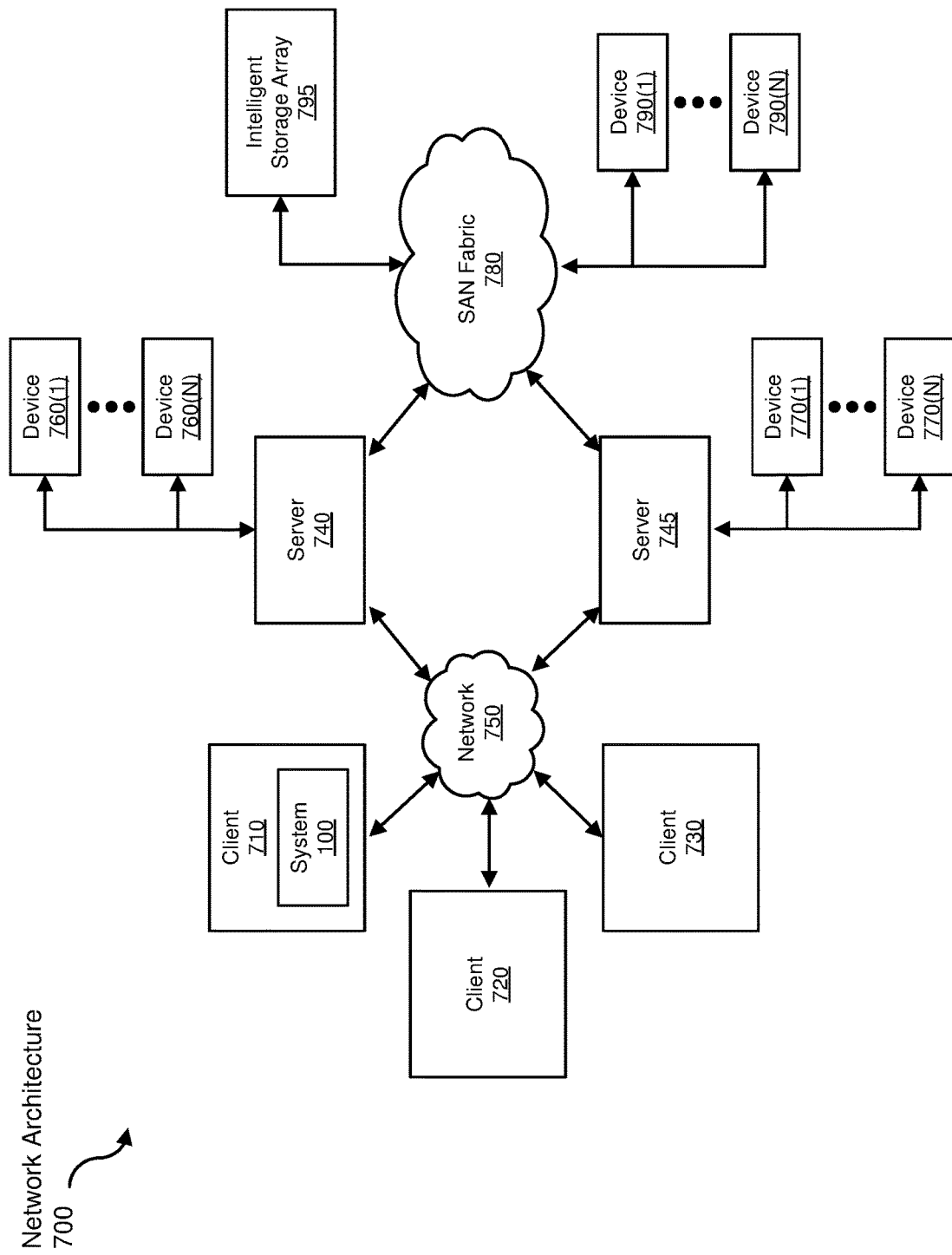
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for authenticating a multimedia stream.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a multimedia stream to be transformed, transform the multimedia stream, output a result of the transformation to generate a metadata transcript, use the result of the transformation to compare with another metadata transcript, and store the result of the transformation for authenticating the multimedia stream. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for authenticating a multimedia stream, at least a portion of the method being performed by a computing device comprising at least one processor, the method comprising:
   generating a metadata transcript based on at least a portion of a multimedia stream;
   digitally signing the metadata transcript;
   transmitting both the digitally signed metadata transcript and the multimedia stream to a recipient device to enable the recipient device to authenticate the multimedia stream based on a comparison of the digitally signed metadata transcript with an observed metadata transcript, wherein the observed metadata transcript is locally generated by the recipient device based on the multimedia stream;
   generating an original sense graph from the digitally signed metadata transcript;
   generating an observed sense graph from the observed metadata transcript; and
   authenticating the multimedia stream when the observed sense graph represents the original sense graph.

2. The computer-implemented method of claim 1, wherein the comparison of the digitally signed metadata transcript with the observed metadata transcript includes a direct comparison, and the multimedia stream is authenticated based on the digitally signed metadata transcript matching the observed metadata transcript.

3. The computer-implemented method of claim 1, wherein:
   generating the original sense graph from the digitally signed metadata transcript is based on natural language processing;
   generating the observed sense graph from the observed metadata transcript is based on natural language processing; and
   authenticating the multimedia stream includes comparing the original sense graph with the observed sense graph to determine whether the observed sense graph represents the original sense graph.

4. The computer-implemented method of claim 1, further comprising embedding the digitally signed metadata transcript into the multimedia stream.

5. The computer-implemented method of claim 1, further comprising storing the digitally signed metadata transcript on a cloud server accessible to the recipient device.

6. The computer-implemented method of claim 1, wherein the metadata transcript includes a textual transcript of dialogue in the multimedia stream.

7. The computer-implemented method of claim 1, wherein the metadata transcript includes identifications of persons in the multimedia stream.

8. The computer-implemented method of claim 1, wherein the metadata transcript includes descriptions of at least one of microexpressions, vocal expressions, tone of voice, body language, and hand gestures of persons in the multimedia stream.

9. A computer-implemented method for authenticating a multimedia stream, at least a portion of the method being performed by a computing device comprising at least one processor, the method comprising:
   receiving, from a signing device, both a multimedia stream and a digitally signed metadata transcript corresponding to the multimedia stream;
   authenticating the digitally signed metadata transcript;
   generating an observed metadata transcript based on the received portion of the multimedia stream;
   comparing the authenticated metadata transcript to the observed metadata transcript by:
      generating an original sense graph from the authenticated metadata transcript;
      generating an observed sense graph from the observed metadata transcript; and
   authenticating, based on the observed sense graph representing the original sense graph, the received portion of the multimedia stream.

10. The computer-implemented method of claim 9, wherein the comparison of the authenticated metadata transcript with the observed metadata transcript includes a direct comparison, and the multimedia stream is authenticated based on the authenticated metadata transcript matching the observed metadata transcript.

11. The computer-implemented method of claim 9, wherein:
   generating the original sense graph from the authenticated metadata transcript is based on natural language processing;
   generating the observed sense graph from the observed metadata transcript is based on natural language processing; and
   authenticating the received portion of the multimedia stream includes comparing the original sense graph with the observed sense graph to determine whether the observed sense graph represents the original sense graph.

12. The computer-implemented method of claim 9, further comprising extracting the digitally signed metadata transcript from the multimedia stream.

13. The computer-implemented method of claim 9, further comprising retrieving the digitally signed metadata transcript from a cloud server accessible to the recipient device.

14. The computer-implemented method of claim 9, wherein the metadata transcript includes one or more of:
   a textual transcript of dialogue in the multimedia stream;
   identifications of persons in the multimedia stream; and
   descriptions of at least one of microexpressions, vocal expressions, tone of voice, body language, and hand gestures of persons in the multimedia stream.

15. A system for authenticating a multimedia stream, the system comprising:
   a signing device comprising at least one physical processor and at least one module configured to:
      generate a metadata transcript based on at least a portion of a multimedia stream;
      digitally sign the metadata transcript; and
      transmit both the digitally signed metadata transcript and the multimedia stream; and
   a recipient device comprising at least one physical processor and at least one module configured to:
      receive both the digitally signed metadata transcript and the multimedia stream from the signing device;
      authenticate the digitally signed metadata transcript;
      generate an observed metadata transcript based on the multimedia stream;
      compare the authenticated metadata transcript to the observed metadata transcript by:
         generating an original sense graph from the authenticated metadata transcript;
         generating an observed sense graph from the observed metadata transcript; and
      authenticate, based on the observed sense graph representing the original sense graph, the multimedia stream.

16. The system of claim 15, wherein the comparison of the authenticated metadata transcript with the observed metadata transcript includes a direct comparison, and the multimedia stream is authenticated based on the authenticated metadata transcript matching the observed metadata transcript.

17. The system of claim 15, wherein:
   generating the original sense graph from the authenticated metadata transcript is based on natural language processing;
   generating the observed sense graph from the observed metadata transcript is based on natural language processing; and
   authenticating the multimedia stream includes comparing the original sense graph with the observed sense graph to determine whether the observed sense graph represents the original sense graph.

18. The system of claim 15, wherein transmitting both the digitally signed metadata transcript and the multimedia stream comprises embedding the digitally signed metadata transcript into the multimedia stream.

19. The system of claim 15, wherein transmitting both the digitally signed metadata transcript and the multimedia stream comprises storing the digitally signed metadata transcript on a cloud server accessible to the recipient device.

20. The system of claim 15, wherein the metadata transcript includes one or more of:
   a textual transcript of dialogue in the multimedia stream;
   identifications of persons in the multimedia stream; and
   descriptions of at least one of microexpressions, vocal expressions, tone of voice, body language, and hand gestures of persons in the multimedia stream.

* * * * *